United States Patent [19]

Richar et al.

[11] Patent Number: 5,405,836
[45] Date of Patent: Apr. 11, 1995

[54] PET FOODS WITH WATER-SOLUBLE ZINC COMPOUND COATING FOR CONTROLLING MALODOROUS BREATH

[75] Inventors: Thomas Richar, Long Valley; James B. Taylor, Sparta; Jan Karwowski, Franklin Lakes; Felice Scaglione, Hasbrouck Heights; James E. Roe, Wayne; Michael S. Otterburn, Randolph; Wayne Steensen, Rockaway; Henry C. Spanier, West Milford, all of N.J.; Richard L. Antrim, Solon; Leif Solheim, Clinton, both of Iowa

[73] Assignee: Nabisco, Inc., Parsippany, N.J.

[21] Appl. No.: 26,395

[22] Filed: Mar. 2, 1993

[51] Int. Cl.6 .................. A61K 31/70; A61K 7/16; A61K 7/26; A23L 1/314

[52] U.S. Cl. .................. 514/23; 424/49; 424/53; 424/439; 424/442; 426/72; 426/74; 426/805

[58] Field of Search .................. 426/72, 74, 805; 424/49, 53, 439, 442; 514/23

[56] References Cited

U.S. PATENT DOCUMENTS

| | | | |
|---|---|---|---|
| 2,527,686 | 10/1950 | Sandberg | 424/49 |
| 2,760,866 | 8/1956 | Nielsen | 426/805 |
| 3,772,431 | 11/1973 | Mlkvy et al. | 424/44 |
| 3,888,976 | 6/1975 | Mlkvy et al. | 424/49 |
| 3,899,607 | 8/1975 | Miller et al. | 426/805 |
| 3,997,675 | 12/1976 | Eichelburg | 426/805 |
| 4,022,880 | 5/1977 | Vinson et al. | 424/49 |
| 4,032,665 | 6/1977 | Miller et al. | 426/805 |
| 4,082,841 | 4/1978 | Pader | 424/50 |
| 4,138,477 | 2/1979 | Gaffar | 424/52 |
| 4,144,323 | 3/1979 | Lamberti | 424/54 |
| 4,152,418 | 5/1979 | Pader | 424/50 |
| 4,154,815 | 5/1979 | Pader | 424/50 |
| 4,260,635 | 4/1981 | Fisher | 426/3 |
| 4,289,754 | 9/1981 | Dhabhar et al. | 424/52 |
| 4,289,755 | 9/1981 | Dhabhar | 424/52 |
| 4,339,432 | 7/1982 | Ritchey et al. | 424/54 |
| 4,364,925 | 12/1982 | Fisher | 424/50 |
| 4,469,674 | 9/1984 | Shah et al. | 424/52 |
| 4,503,070 | 3/1985 | Eby, III | 424/289 |
| 4,525,341 | 6/1985 | Deihl | 424/43 |
| 4,618,601 | 10/1986 | Chazot | 514/23 |
| 4,647,452 | 3/1987 | Ritchey et al. | 424/49 |
| 4,664,906 | 5/1987 | Sipos | 424/49 |
| 4,684,528 | 8/1987 | Godfrey | 424/49 |
| 4,689,214 | 8/1987 | Niles et al. | 424/49 |
| 4,737,365 | 4/1988 | Meyer | 426/807 |
| 4,740,368 | 4/1988 | Plevy | 424/48 |
| 4,758,439 | 7/1988 | Godfrey | 424/49 |
| 4,784,861 | 11/1988 | Gori | 426/804 |
| 4,814,163 | 3/1989 | Barth | 424/49 |
| 4,814,164 | 3/1989 | Barth et al. | 424/49 |
| 4,853,213 | 8/1989 | Thame | 424/58 |
| 4,871,532 | 10/1989 | Hoogendoorn | 424/49 |
| 4,992,259 | 2/1991 | Schiraldi et al. | 424/49 |
| 5,011,679 | 4/1991 | Spanier et al. | 424/57 |
| 5,015,485 | 5/1991 | Scaglione et al. | 426/89 |
| 5,017,389 | 5/1991 | Green | 426/805 |
| 5,290,584 | 3/1994 | Ray | 426/448 |
| 5,296,217 | 3/1994 | Stookey | 426/805 |

FOREIGN PATENT DOCUMENTS 2210264A 6/1989 United Kingdom .

OTHER PUBLICATIONS

*The Condensed Chemical Dictionary*, 10th ed., Hawley, G. G., Van Nostrand Reinhold Company, N.Y. pp. 1107–1109 (1981).

*Primary Examiner*—Ronald W. Griffin

[57] ABSTRACT

Breath freshening, dry pet foods, e.g., pet biscuits are prepared by topically applying a breath freshening amount of a water-soluble zinc salt to a farinaceous-based baked or cooked pet food. The amount of the water-soluble zinc salt is sufficient so that said topically-applied water-soluble zinc salt contains from about 2 mg to about 6 mg of zinc ion per 10 gm of the breath freshening pet food. Consumption of the dry pet food controls the malodorous breath of the animal. Rawhide chew coated in the same manner also provides breath freshening when chewed.

29 Claims, 2 Drawing Sheets

PET FOODS WITH WATER-SOLUBLE ZINC COMPOUND COATING FOR CONTROLLING MALODOROUS BREATH

BACKGROUND OF THE INVENTION

1. Field of the Invention

The invention relates to pet foods, such as, canine biscuits, rawhide chews and feline biscuits for controlling the malodorous breath of animals, such as, dogs and cats. The invention also relates to processes for preparing such pet foods. The invention further relates to processes of controlling malodorous breath of pets, such as, dogs and cats, chewing on and eating such biscuits or chewing on such rawhide.

2. Background Art

Numerous volatile compounds are present in the headspace of the oral cavity, but the most important, in terms of concentration of potency, are volatile sulfur compounds. These compounds are formed by the putrefaction of sulfur-containing proteinaceous substrates by predominately gram-negative microorganisms in the mouth, primarily on the tongue. Volatile sulfur compounds (VSC) found in the oral headspace of individuals examined by investigators were hydrogen sulfide, methyl mercaptan (methanethiol), dimethyl sulfide and dimethyl disulfide. Of these, the two most volatile (i.e., odorous) are hydrogen sulfide ($H_2S$) and methyl mercaptan ($CH_3SH$). These sulfur compounds are regarded as the principal contributors to breath malodor.

Zinc acetate is an ingredient of dietary supplements i.e., to 1 mg daily [*The Condensed Chemical Dictionary*, 10th Ed., (1981), page 1107]. Zinc gluconate is a known dietary supplement and food additive and is used in vitamin tablets [*The Condensed Chemical Dictionary*, ibid., page 1109]

Zinc carbonate is useful as a topical antiseptic [*The Condensed Chemical Dictionary*, ibid., page 1108].

There are several patent references which disclose certain types of animal foods which contain zinc compounds.

U.S. Pat. No. 2,760,866 (Nielsen) discloses a feeding ration product for farm animals which dissolves in the drinking water of the animal and through the medium of the drinking water furnishes the animal with its optimal amounts of supplementary minerals. The product contains large amounts of phosphates and comparatively small amounts of zinc sulfate and other sulfates.

U.S. Pat. No. 3,899,607 ((Miller et al.) and its divisional case U.S. Pat. No. 4,032,665 (Miller et al.) disclose the production of a simulated bone by extrusion of a dough composition into a "bone-like shape" under conditions of elevated temperature and pressure. While these patents make no mention of the effect of zinc salts on controlling mouth odor, they disclose the use of a whitish pigment, such as, titanium dioxide or zinc oxide as an optional ingredient for raising the whiteness of the product.

U.S. Pat. No. 3,997,675 (Eichelburg) discloses that the palatability of dry animal food is improved by coating it with yeast which includes either primary dried yeast or secondary yeasts. According to Eichelburg, secondary brewer's dried yeast analyzes typically as containing 38.7 ppm zinc.

U.S. Pat. No. 4,737,365 (Meyer) discloses dry blending zinc oxide and zinc carbonate with proteinaceous feeds for dairy cattle and beef cattle to protect the protein against rumen digestion. Milk production in dariy cattle and rate of weight gain in beef cattle, it is disclosed, can be increased in relation to protein intake.

There are several patent references which disclose oral compositions which contain zinc salts as breath control agents.

U.S. Pat. No. 4,138,477 (Gaffar) discloses compositions for preventing and controlling mouth odor which contains, as the essential agent, a zinc-polymer combination formed by the reaction or interaction of a zinc compound with an anionic polymer containing carboxylic, sulfonic and/or phosphoric acid radicals. In Table I, at column 2, zinc oxide per se is tested against a combination of zinc oxide plus a copolymer. Numerous examples of zinc compounds that may be employed in combination with the polymer are listed at column 4, lines 5 to 26. The composition is disclosed as inhibiting volatile sulfur compounds, such as, hydrogen sulfide, methyl mercaptan and dimethyl sulfide. The zinc-polymer combinations, it is taught, have very little of the astringent, metallic taste characteristic of zinc ions. The composition may be used in mouth washes, dental creams, sugarless pressed candy and chewing gum.

U.S. Pat. No. 4,289,754 (Dhabhar et al.) and U.S. Pat. No. 4,325,939 (Shah) disclose mouthwash compositions containing an alkali metal or ammonium zinc citrate which provides less astringency without loss of anti-odor properties. It is also disclosed that zinc chloride has been used in mouthwash compositions and recognized as posssessing anti-mouth odor properties in those compositions.

U.S. Pat. No. 4,289,755 (Dhabhar) discloses a mouthwash composition with acceptable astringency and without loss of anti-odor properties and improved compatability with fluoride ions. The mouthwash composition employs zinc citrate. It is also disclosed that zinc chloride has been recognized as possessing anti-mouth odor properties in mouthwash compositions.

U.S. Pat. No. 4,469,674 (Shah et al.) discloses oral compositions containing zinc salicylate, zinc lactate or zinc gluconate in combination in an ionic fluoride salt to eliminate volatile sulfur compounds from the breath. The compositions may be used in a mouthwash, toothpaste, chewing gum, or lozenge.

U.S. Pat. No. 4,689,214 (Niles et al.) discloses a composition to prevent breath odor which contains a salt which provides zinc ions and an ionone ketone terpene derivative. Zinc compounds which may be used are listed at column 2, lines 1 to 10. The composition may be in the form of a mouth spray, mouth rinse or toothpaste.

U.S. Pat. No. 4,814,163 (Barth) discloses that zinc compounds are generally known to have deodorizing properties as well as other properties desirable in oral hygiene. See the paragraph bridging columns 1 and 2. Barth discloses a non-cariogenic, long-lasting, slow-dissolving solid antitartar mouth deodorant having improved taste and extended mouth odor reduction and control of tartar formation comprising a zinc compound which provides zinc, an ionone ketone terpene derivative and a mint flavor. The ingredients include a gluconate salt and an acidic pH to aid in zinc solubilization, in a sugar-free carrier. Zinc salts which may be used are listed at column 3, lines 40 to 52.

Petrodex breath spray for dogs and cats is commercially distributed. The breath spray is contained in a pump-top dispenser. The breath spray is stated to act quickly to help neutralize/control offensive mouth odors and unpleasant tastes and to help control bacteria and promote healthy gums. The ingredients of the breath spray is stated to be deionized water, glycerine, xylitol, ascorbic acid, zinc gluconate, carboxymethyl cellulose, flavor, glucose oxidase and lysozyme.

Maxi/Guard Oral Cleansing Formula (as a spray) is commercially distributed for bad breath and odor control. It is stated to contain zinc ascorbate which helps control the by-products of harmful bacteria in the oral cavity and sulfur bearing amino acids which absorb malodorous substances in the mouth.

Canine Breath Freshener is commercially distributed for bad breath and odor control.

See also U.S. Pat. Nos. 2,527,686, 3,772,431, 3,888,976, 4,022,880, 4,082,841, 4,144,323, 4,152,418, 4,154,815, 4,260,635, 4,364,925, 4,339,432, 4,503,070, 4,618,601, 4,647,452, 4,664,906, 4,684,528, 4,758,439, 4,740,368, 4,784,861 and 4,871,532, and British Published Patent Application No. 2210264A.

BROAD DESCRIPTION OF THE INVENTION

An objective of the invention is to provide dry, solid animal food with a topically-applied water-soluble zinc salt, particularly dog biscuits with a topically-coated water-soluble zinc salt. Another objective of the invention is to provide a process for preparing dry, solid animal food with a topically-applied water-soluble zinc salt, particualrly dog biscuits with a topically-applied water-soluble zinc salt. Another objective of the invention is to provide a process for controlling the malodorous breath of animals, particualarly dogs and cats. Another objective of the invention is to provide a process for controlling the malodorous breath of animals by the consumption, i.e., chewing and eating of the dry, solid animal food with a topically-applied water-soluble zinc salt by the animals, particularly by the chewing and eating of the dog biscuits with a topically-applied water soluble zinc salt by the dogs. A further objective of the invention is to provide chew rawhide with a topically-applied water-soluble zinc salt. Another objective of the invention is to provide a process for preparing chew rawhide with a topically-applied water-soluble zinc salt. Another objective of the invention is to provide a process for controlling the malodorous breath of the dogs by the chewing of the chew rawhide with a topically-applied water-soluble zinc salt by the dogs. Other objectives and advantages of the invention are set out herein or are obvious herefrom to one skilled in the art.

The objectives and advantages of the invention are achieved by the compositions and processes of the invention.

The invention involves breath freshening pet biscuits. The farinaceous-based baked biscuits have a breath freshening effective amount of at least one water-soluble zinc salt topically applied thereto. There is a coating of the topically-applied water-soluble zinc salt on the baked biscuits. Preferably the biscuit is a canine biscuit and the water-soluble zinc salt is zinc sulfate, zinc gluconate or zinc chloride. Preferably the amount of the topically-applied water-soluble zinc salt is sufficient so that the topically-applied water-soluble zinc salt contains from about 2 mg to about 6 mg of zinc ion per biscuit. The water-soluble zinc salt can be applied in a coating composition comprising a fat. Preferably the water-soluble zinc salt has been applied in an aqueous solution, more preferably in a hot tallow water mixture.

Ionic zinc (in the form of zinc salts) diminishes dog breath malodor when applied directly to a dog's mouth and soluble salts (sulfate, gluconate and chloride) are more effective than insoluble ones (oxide and citrate). Zinc sulfate, when baked into a Milk Bone ® dog biscuit, diminishes dog breath malodor. Its release from the product into the dog's mouth (i.e., effectiveness) is somewhat low due to binding of zinc to a component in the biscuit. Despite this, a biscuit with 4 mg of zinc as an active breath control agent is more effective than a biscuit alone at reducing dog breath malodor. A biscuit that had zinc as an active breath control agent is more effective than a biscuit alone at reducing dog breath malodor. A biscuit that had zinc added as a topical coating (dipped) shows better zinc release than one where the zinc is added before baking.

When biscuits are the delivery system for the active breath control agent a post bake application of, i.e., a water-soluble zinc salt, (dipping or spraying) is preferred. An additional drying step after the spray or dipping operation may be required.

The term "dog biscuit" herein means a baked dog biscuit unless otherwise stated herein or otherwise obvious herefrom to one skilled in the art.

The dog biscuits can be made from any suitable dough. In one advantageous embodiment, a bone-shaped canine biscuit is provided which is baked from a dough comprising wheat flour, wheat meal, soybean meal, meat and bone meals, animal fat and water.

The invention also involves a method for preparing breath freshening pet biscuits. The process includes: forming a farinaceous-based dough into pieces; baking the pieces; and applying at least one water-soluble zinc salt to the surface of the pieces in an effective breath freshening amount. Preferably the water-soluble zinc salt is applied as an aqueous solution. Preferably the water-soluble zinc salt is applied by dipping the baked pieces in an aqueous solution comprising the water-soluble zinc salt. Preferably the zinc salt is applied by spraying the baked pieces with an aqueous solution (more preferably a hot tallow water mixture) comprising the water-soluble zinc salt. The water-soluble zinc salt can be applied in a coating composition comprising fat. Preferably the water-soluble zinc salt is zinc sulfate, zinc gluconate or zinc chloride. Preferably the water-soluble zinc salt is applied in an amount to deliver from at least about 2 mg to about 6 mg of zinc ions per biscuit.

The invention also involves a process for the controlling the malodorous breath of dogs, cats or other animals by the consumption, i.e., chewing and eating, of the farinaceous-based baked biscuits having a breath freshening effective amount of at least one water-soluble zinc salt topically applied thereto by the animals. There is a coating of the topically-applied water-soluble zinc salt on the baked biscuits. Preferably the biscuit is a canine biscuit and the water-soluble zinc salt is zinc sulfate, zinc gluconate or zinc chloride. Preferably the amount of the topically-applied water-soluble zinc salt is sufficient so that the topically-applied water-soluble zinc salt contains from about 2 mg to about 6 mg of zinc ion per biscuit. The water-soluble zinc salt can be applied in a coating composition comprising a fat. Preferably the water-soluble zinc salt has been applied in an aqueous solution, more preferably in a hot tallow water mixture.

The invention also involves a breath freshening, dry (farinaceous-based) pet food, such as, a main meal. The farinaceous-based baked or cooked pet food has a breath freshening amount of the water-soluble zinc salt topically applied thereto. Preferably the amount of the topically-applied water-soluble zinc salt is sufficient so that the topically-applied water-soluble zinc salt contains from about 2 mg to about 6 mg of zinc ion per 10 gm of the breath freshening pet food. Preferably the water-soluble zinc salt is zinc sulfate, zinc gluconate, or zinc chloride. The water-soluble zinc salt can be applied in a coating composition comprising a fat. Preferably the water-soluble zinc salt has been applied in an aqueous solution, more preferably in a hot tallow water mixture. Preferably the water activity is less than equal to about 0.7 and the moisture content is less than or equal to about 15 percent by weight of the breath freshening pet food.

The invention also involves a process for the controlling of the malodorous breath of animals by the consumption, i.e., chewing and eating of the breath freshening, dry pet food by the animals. The farinaceous-based baked or cooked pet food has a breath freshening amount of the water-soluble zinc salt topically applied thereto. Preferably the amount of the water-soluble zinc salt is sufficient so that the topically-applied water-soluble zinc salt contains from about 2 mg to about 6 mg of zinc ion per 10 gm of the breath freshening pet food. Preferably the water-soluble zinc salt is zinc sulfate, zinc gluconate, or zinc chloride. The water-soluble zinc salt can be applied in a coating composition comprising a fat. Preferably the water-soluble zinc salt has been applied in an aqueous solution, more preferably in a hot tallow mixture. Preferably the water activity is less than equal to about 0.7 and the moisture content is less than or equal to about 15 percent by weight of the breath freshening pet food.

The invention further involves breath freshening rawhide chew. The rawhide has a breath freshening effective amount of the water-soluble zinc salt topically applied thereto. Preferably the water-soluble zinc salt is zinc sulfate, zinc gluconate or zinc chloride. Preferably the amount of said topically applied water-soluble zinc salt is sufficient so that the topically-applied water-soluble zinc salt contains from about 6 mg to about 20 mg of zinc ion per 9.1 gm of rawhide chew. The water-soluble zinc salt can be applied in a coating composition comprising a fat. Preferably the water-soluble zinc salt has been applied in an aqueous solution, more preferably in a hot tallow water mixture.

The best release of zinc from a product has been observed when the water-soluble zinc salt was applied to a coating on a rawhide chew strip. Fifty five percent of the zinc in the coating was released in the first minute during dissolution tests. As compared to dog biscuits and other dry pet foods, rawhide chew strips offer a better overall delivery of active breath control agent. It is believed that there is increased contact time in the dog's mouth and reduced penetration of the zinc salt into the substrate.

The invention involves a method for preparing a breath freshening rawhide chew. The invention includes: forming rawhide into pieces; and applying the water-soluble zinc salt to the surface of the pieces in an effective breath freshening amount. Preferably the water-soluble zinc salt is applied in an aqueous solution. Preferably the water-soluble zinc salt is applied by dipping the rawhide pieces in an aqueous solution comprising the water-soluble zinc salt, more preferably in a hot tallow water mixture. In another preferred embodiment the water-soluble zinc salt is applied by spraying the rawhide pieces with an aqueous solution comprising the water-soluble zinc salt. The water-soluble zinc salt can be applied in a coating composition comprising fat. Preferably the water-soluble zinc salt is zinc sulfate, zinc gluconate or zinc chloride. Preferably the zinc salt is applied in an amount which is sufficient so that the topically-applied water-soluble zinc salt contains from at least about 6 mg to about 20 mg of zinc ions per 9.1 gm of rawhide chew.

The invention also includes a process for the controlling of the malodorous breath of animals by the chewing of the breath freshening rawhide chew by the animals. The rawhide has a breath freshening effective amount of the water-soluble zinc salt topically applied thereto. During the chewing an effective breath freshening amount of zinc ions are released into the animal's oral cavity for reaction with malodorous breath compounds. Preferably the water-soluble zinc salt is zinc sulfate, zinc gluconate or zinc chloride. Preferably the amount of said topically applied water-soluble zinc salt is sufficient so that the topically-applied water-soluble zinc salt contains from about 6 mg to about 20 mg of zinc ion per 9.1 gm of rawhide chew. The water-soluble zinc salt can be applied in a coating composition comprising a fat. Preferably the water-soluble zinc salt has been applied in an aqueous solution, more preferably in a hot tallow water mixture.

The invention compositions control the (malodorous) breath odor of dogs, cats, horses and other pets or show animals (the invention does not apply to humans or non-mammal animals). In embodiments of the present invention water-soluble zinc salts are topically applied to dry pet foods which may be consumed as a main meal, canine/feline biscuits or rawhide chew pieces (e.g., strips).

DETAILED DESCRIPTION OF THE INVENTION

As used herein, all parts, percentages, ratios and proportions are on a weight basis unless otherwise stated herein or otherwise obvious herefrom to one skilled in the art. As used herein, all temperatures are in degrees Fahrenheit unless otherwise stated herein or otherwise obvious herefrom to one skilled in the art.

The coating of water-soluble zinc salt is topically applied in the invention to the surfaces of dry pet food, particularly baked dog biscuits, or of rawhide chews. Water soluble zinc salts effectively diminish volatile sulfur compounds in humans. The zinc salts combine readily with hydrogen sulfide to form insoluble (i.e., non-odorous) compounds. As the level of ionic zinc ($Zn^{++}$) in a product increases, the ability of that product to diminish volatile sulfur compounds also increases. However, complaints of an astringent aftertaste were mentioned by human subjects when levels of zinc within a dog biscuit were greater than 1 mg of $Zn^{++}$ per Mint Milk Bone ® dog biscuit. Furthermore, when the zinc compound is used within the dog biscuit, the zinc combines/chelates with the fiber, bran, meat, etc., in the dog biscuit, thereby reducing the effectiveness of the zinc as a breath freshener. The invention eliminates this problem by coating the water-soluble zinc salt on the surface of the dog biscuits (or dry pet foods or rawhide chews).

The invention will be detailed below for dog biscuits, but the description generally applies to dry pet foods such as pelletized dog or cat foods, main meals (e.g., extruded pet foods having 6 to 8 percent moisture), etc.

The invention coating can be applied, for example, to dog food, such as, dog biscuits, which can be made from conventional dog food dough, such as, conventional dog biscuit doughs. The dough can comprise at least one flour, meal, fat and water. For instance, when the desired product is a canine biscuit, a conventional dough for dog biscuits can be used, optionally containing discrete particles of meat and/or meat byproducts or farinaceous material. Such doughs typically contain fat solids. Examples of suitable doughs for the production of hard dog biscuits are disclosed in U.S. Pat. Nos. 4,454,163 and 4,743,459, and suitable doughs for the production of soft dog biscuits (containing humectant to control water activity) are disclosed in U.S. Pat. No. 4,454,164. The pertinent portions of U.S. Pat. Nos. 4,454,163, 4,454,164 and 4,743,459 are incorporated herein by reference. Particulate proteinaceous particles, such as, particles of meat, texturized vegetable protein and/or meat byproducts, can be incorporated to add flavor to the biscuits and texturize the surface. (See U.S. Pat. No. 4,743,459, for example.) Particular farinaceous materials, such as, bran particles, can also be employed to texturize the interior and/or surface or the biscuits and to provide other useful properties to the product. A dough found to produced biscuits highly palatable to dogs includes suitable proportions of wheat flour, wheat meal, soybean meal, meat and bone meal, animal fat and natural flavors in admixture with water. The meal used in the doughs suitable for production of biscuits useful in the invention can comprise meat and/or bone and/or vegetable matter including farinaceous materials, materials prepared from legumes such as beans and peas, tuberous materials such as potato meal, and the like. The meals can be finely or coarsely ground as desired for the texture. Flours made from any suitable farinaceous material can be used.

The doughs generally have a water activity of about 0.90 and above upon the completion of the mixing of the dough ingredients. A suitable dough contains farinaceous material, an edible oil, an antioxidant, an antimycotic, salt, animal fat, added vitamins and minerals, such as those disclosed in U.S. Pat. No. 4,229,485, column 5, lines 7 to 57, which is incorporated herein by reference. The compositions of the invention also preferably contain at least one animal-derived proteinaceous meal such as meat meal, bone meal and fish meal. A good biscuit dough for producing the biscuits of the invention contains about 50 to 60 percent by weight of wheat flour, about 5 to 10 percent by weight of soybean meal, about 3 to 10 percent by weight of meat and bone meal, about 1 to 5 percent of wheat meal, about 1 to 5 percent of animal fat preserved with BHA, about 20 to 30 percent by weight of water, about 2 to 5 percent by weight of natural flavors, vitamin and mineral preblend, and acidulant.

The dough ingredients are generally admixed at a temperature of about 45° to about 140° F., preferably about 60° to about 125° F.

The dog biscuit doughs can contain a softening agent or humectant. The preferred humectant is propylene glycol. Examples of other humectants which can be used are corn syrup, sugar and polyalcohols, such as, sorbitol and glycerin.

The dough can also contain edible surfactants or emulsifying agents, e.g., cationic agents and nonionic agents. Exemplary nonionic emulsifying agents can be broadly defined as compounds produced by the condensation of alkylene oxide groups (hydrophilic in nature) with an organic hydrophobic compound which can be aliphatic, alkyl aromatic, or a condensate of an alkylene oxide with an alkylene glycol (hydrophilic in nature). Examples of nonionic emulsifying agents which can be used include polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides and mixture of such materials. The emulsifier is best used in minor amounts.

The dog biscuit dough can be mixed using conventional equipment. For example, the mixing can be at 20 to 100 rpm. For example, a dry blending step can be done at room temperature for a period of time of about 3 minutes to about 20 minutes. The dry-blended mixture can then be mixed with hot water to form a first stage dough. The water which can be admixed with the dry-blended mixture is typically at a temperature of about 65° to about 150° F. The hot water can be added, with mixing, over a period of time of about 3 minutes to about 6 minutes to form the first stage dough. Then, the fat portion of the biscuit dough can be admixed with the first stage dough to form the final stage dough. The fat portion can be added at a temperature at which it is at least fluid, typically at about 100° to about 150° F. The fat portion can be mixed for a period of time which is sufficient to form a dough whose homogeneity is visually apparent. A typically final mixing time is about 3 to about 5 minutes.

Formation of the dough is achieved at about atmospheric pressure with the mixing of the components being conveniently achieved in an upright sigma blade mixer or other bakery-type mixers. The various ingredients can be added over a period of time or in a one-shot manner according to the above order of addition. However, melted fat and water can be added simultaneously and mixed for 6 to 10 minutes.

The dog biscuits are formed in any conventional or suitable manner, such as, by extrusion, stamping, cutting or molding. Any suitable dog biscuit shapes can be used, such as, a bone-shaped (preferred) canine biscuit. For many products, such as, the bone-shaped canine biscuits of the invention, a rotary molding system is preferred because it permits the rapid forming of dough pieces with good control over their shape, form and surface characteristics. Docker holes are preferably formed in the dough piece during molding to facilitate the escape of moisture during baking, cooking and/or drying.

The dough can then be formed into pieces by machining on a rotary molder with specific die shapes. The dough can also be formed into pieces by sheeting followed by either a vertical or rotary cutter or by a rotary molder. Suitable die and cutter shapes are those which result in biscuit products having bone round, square, triangular, T-bone or chop shapes and the like. The forming is achieved at conventional temperatures of ambient to 110° F. and pressures of less than 75 p.s.i. (gauge), used with a rotary molder, a vertical cutter or rotary cutter.

The dough pieces can be baked using any suitable or conventional equipment and conditions. For example, the dough pieces can be passed into an oven such as a conventional oven where the biscuit is baked. The conveyer belts of the oven can be coated with an edible lubricant, such as, a natural or synthetic cooking oil or shortening, to facilitate separation of the conveyer belts of the baked product. Temperatures in the range of about 300° to about 600° F. can be used. The baked biscuits can also be subjected to subsequent drying at temperatures of about 200° to 400° F., either within the baking oven or separately, to produce the desired moisture content in the final product.

The formed pieces are baked, followed by drying, to achieve a shelf stable product without the need of any moisture barrier protection. Baking and drying temperatures and times are those conventionally used in the production of a hard, dry canine biscuit. The pieces are dried to obtain a biscuit having a water activity of 0.70 or less. Typically, baking temperatures and times are about 300° F. to about an average of 475° F. for about 25 minutes to about 8 minutes. Drying conditions are typically about 200° to about 325° F. for about 25 minutes to about 12 minutes in a forced air dryer. On a weight basis, the moisture content of the final biscuit product is less than or equal to about 15 percent by weight and preferably about 10 to 12 percent by weight of the final biscuit at 70 percent relative humidity.

The invention coating can be applied to the dog biscuit dough pieces before baking followed by baking at a low baking temperature of, say, about 300° to about 310° F. It is preferable to apply the invention coating after the dog biscuit dough pieces have been baked, but before the baked pieces are dried. Conventional drying times and temperatures can be used, longer times may be needed to remove the added water from the coating.

If the invention coating is applied after the dog biscuit dough pieces have been baked and dried, a further short drying at conventional drying temperatures is normally necessary.

The coating is topically applied to the dog biscuits for example by spraying or dipping—the latter gives a more uniform coating (and is less messy). Conventional spraying or dipping equipment can be used. The concentration of the zinc salt in the spray or dipping solution should be such that 2 to 6, preferably 5 to 6, mg of zinc is obtained on the dog biscuit.

Dog biscuits (or other dry pet/animal food), having one of the coating compositions (without any organic pyrophosphate) disclosed in U.S. Pat. No. 5,015,485, containing at least one of the water-soluble zinc salts can be topically applied to rawhide chews to form a coating thereon. The pertinent portions of U.S. Pat. No. 5,015,485 are incorporated herein by reference.

The coated invention product is generally as palatable as Milk Bone ® biscuits, which have been widely accepted and a commercial success for many years.

The invention product does not include any fluorine-containing compound or other fluoride ion source, or quaternary ammonium compounds.

The invention deals primarily with dogs, but has a scope of teeth-bearing non-human mammals, such as, cats and horses.

Numerous volatile compounds are present in the headspace of the oral cavity, but the most important, in terms of concentration of potency, are the volatile sulfur compounds. These compounds are formed by the putrefaction of sulfur-containing proteinaceous substrates by predominately gram-negative microorganisms in the mouth, primarily on the tongue. Volatile sulfur compounds (VSC) in the oral headspace of individuals are hydrogen sulfide, methyl mercaptan (methanethiol), dimethyl sulfide and dimethyl disulfide. The same volatile compounds cause bad breath in dogs and other pets. The two most volatile (i.e., odorous) are hydrogen sulfide ($H_2S$) and methyl mercaptan ($CH_3SH$). These sulfur compounds are regarded as the principal contributors to breath malodor. The mechanism of how soluble zinc salts, such as, zinc sulfate decrease the level of volatile sulfur compounds in the mouth is believed to be chemical (and not antibacterial). It is believed that the zinc and sulfur compounds chemically bind to each other, forming a nonvolatile entity. Zinc ions and most transition-metal sulfides do react chemically with $H_2S$.

As used herein, the phrase "water-soluble zinc compounds" includes water-soluble zinc compounds and sparingly water-soluble zinc compounds. As used herein, a sparingly water-soluble zinc compound has a water solubility of greater than about 0.01 mg of the zinc compound per 100 cc water at 20° C., and a water-soluble zinc salt has a water solubility of greater than about 1 gram of the zinc compound per 100 cc at 20° C.

The invention encompasses water-soluble, non-toxic edible zinc salts/compounds. The water-soluble zinc salts are greatly preferred to the water-insoluble salts. Both inorganic and organic zinc salts are encompassed in the invention. Water-soluble zinc compounds permeate throughout the oral cavity to get into the plaque generation areas. The preferred water-soluble zinc salts are zinc sulfate and zinc glutonate (not as astringent as zinc sulfate and longer lasting in effect). Another useful water-soluble zinc salt is zinc chloride. Zinc citrate, while only slightly soluble in water, is a preferred zinc salt as it was surprisingly long lasting (even after 8 to 10 minutes) but not as effective as the two preferred water-soluble zinc salts.

Other water-soluble zinc salts which can be used are zinc acetate, zinc bromide, zinc fluoride, zinc salicylate, zinc iodide and zinc propionate. Other sparingly water-soluble zinc salts which can be used are zinc carbonate, zinc caproate, zinc benzoate and zinc $C_{14}$-alkyl maleate. The zinc salts can be used alone or in combination.

The water-soluble zinc compounds useful in the invention have the desired anti-odor activity.

A high level of astringency is undesirable, so preferably the water-soluble zinc compounds have a low degree of astringency.

The invention composition is used to reduce and control malodorous breath of dogs. Based upon the weight of commercial Milk Bone ® dog biscuits 12 small invention dog biscuits per day, 10 medium invention dog biscuits per day, 6 large invention dog biscuits per day or 4 extra large dog biscuits per day will supply about $\frac{1}{4}$ to $\frac{1}{3}$ of a dog's caloric requirement. The range of zinc that can be used in a product to be fed to dogs may range from a minimum requirement of about 4.5 mg/day to about 60 mg daily.

Suggested feeding information for medium Mint Milk Bone ® dog biscuits (from the product's box) is 10 biscuits a day. (Milk Bone ® is the registered trademark of Nabisco Brands, Inc. for a line of dry, baked dog biscuits.) With an average biscuit weight of 10 grams, this amounts to 100 grams of product per day. If the recommended 10 biscuit per day feeding regime is followed, up to 4 mg of $Zn^{++}$ per biscuit could be added without a problem.

Based upon the recommended feeding of 10 dog biscuits (medium size) a day and the nutritional regulation upper limit, the upper limit of soluble zinc (i.e., $Zn^{++}$) per biscuit is 6 mg; and the lower effective limit is about 2 mg of soluble zinc (i.e., $Zn^{++}$) per dog biscuit. An acceptable range is, therefore, about 2 to 6 mg of soluble zinc (i.e., $Zn^{++}$) per dog biscuit.

The amount of soluble zinc or zinc ion ($Zn^{++}$) which is delivered (in the oral cavity of the dog or other animal) should be at least 15 weight percent, preferably at least 25 weight percent, of the total amount of soluble zinc or zinc ion ($Zn^{++}$) topically applied to a dog biscuit (medium size, 10 gm).

The water (fat) solution, which is to be used, can contain compatible additives, such as, water-soluble flavorants, gums, starches, flavor enhancers, etc. The coating is preferred to be clear, so the type of additive preferably should not cloud or color the coating. The additives should be water soluble. When an additive is used, the additive is present in an amount of up to about 2 weight percent or more, preferably 0.1 to 0.5 weight percent, most preferably 0.05 to 0.3 weight percent, in the water solution.

The pH of the coating is not very important. Although the invention animal foods preferably should be slightly acid to neutral.

The invention coating can be applied to rawhide chews, which are normally provided to dogs for chewing to clean teeth, etc. The rawhide chews can be any of a number of those which are commercially available or can be made in a known manner. Usually rawhide chews are elongated strips of treated rawhide, which may be knotted, but any shapes are useful within the scope of the invention.

The coating is topically applied to the rawhide for example by spraying or dipping—the latter gives a more uniform coating. Conventional spraying or dipping equipment can be used. The aqueous solution can contain a fat, such as, tallow. The fat content of the coating solution can, for example, be up to 10 percent by weight, preferably from about 0.2 to about 3 weight percent, for example, 1 weight percent. The tallow assists the coating to stick to the rawhide chews (or the baked dog or cat biscuit or dry pet food) and to retain its integrity. The dipping or spraying can be performed with a hot water solution when it contains tallow.

A liquefied coating material, having one of the coating compositions (without any organic pyrophosphate) disclosed in U.S. Pat. No. 5,011,679, containing at least one of the water-soluble zinc salts can be topically applied to rawhide chews to form a coating thereon. The pertinent portions of U.S. Pat. No. 5,011,679 are incorporated herein by reference.

The invention is very effective with a dog chewing 2 or 3 pieces per day of the invention coated rawhide chews. There is almost a 100 percent of release of the zinc (there is less penetration of the coating into the rawhide chews than into the dog biscuits). The amount of the soluble zinc or zinc ion which is delivered (in the oral cavity of the dog or other animal) should be at least 25 weight percent, preferably at least 75 weight percent, of the total amount of soluble zinc or zinc ion topically applied to the rawhide chew.

GAS CHROMATOGRAPH METHOD TO DETECT VOLATILE SULFUR COMPOUNDS

Numerous volatile compounds are present in the headspace of the oral cavity, but the most important, in terms of concentration and potency, are volatile sulfur compounds. These compounds are formed by the putrefaction of sulfur-containing proteinaceous substrates by predominantly gram-negative microorganisms in the mouth, primarily on the tongue. Volatile sulfur compounds (VSC) found in the oral headspace of individuals examined by Tonzetich, J., ["Production and Origin of Oral Malodor: A Review of Mechanisms and Methods of Analysis", Journal of Periodontal Surgery, (1988), Vol. 48, No. 1, pp. 13 to 20], and their objectionable levels are:

TABLE I

| Compound | Structure | Objectionable Level |
|---|---|---|
| Hydrogen sulfide | $H_2$—S | 0.15 ng/cc |
| Methyl mercaptan (methanethiol) | $CH_3$—S—H | 0.05 ng/cc |
| Dimethyl sulfide | $CH_3$—S—$CH_3$ | no data |
| Dimethyl disulfide | $CH_3$—S—S—$CH_3$ | 0.19 ng/cc |

Of these, the two most volatile (i.e., odorous) are hydrogen sulfide ($H_2S$) and methyl mercaptan ($CH_3SH$). These sulfur compounds are regarded as the principal contributors to breath malodor. The gas chromatographic method described below had been developed to allow quantitation of extremely low levels of these compounds in human subjects. Slight modifications to the mouthpiece were made for evaluation of breath from dogs.

Figure 1A:
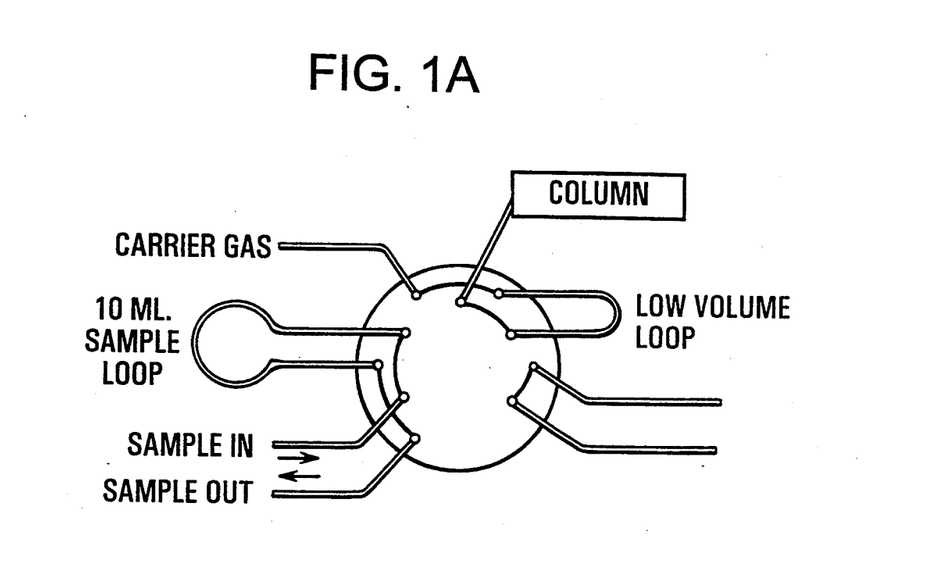
FIGS. 1A and 1B is a schematic of the port valve configuration for a gas chromatograph used to evaluate canine breath.
Figure 1B:
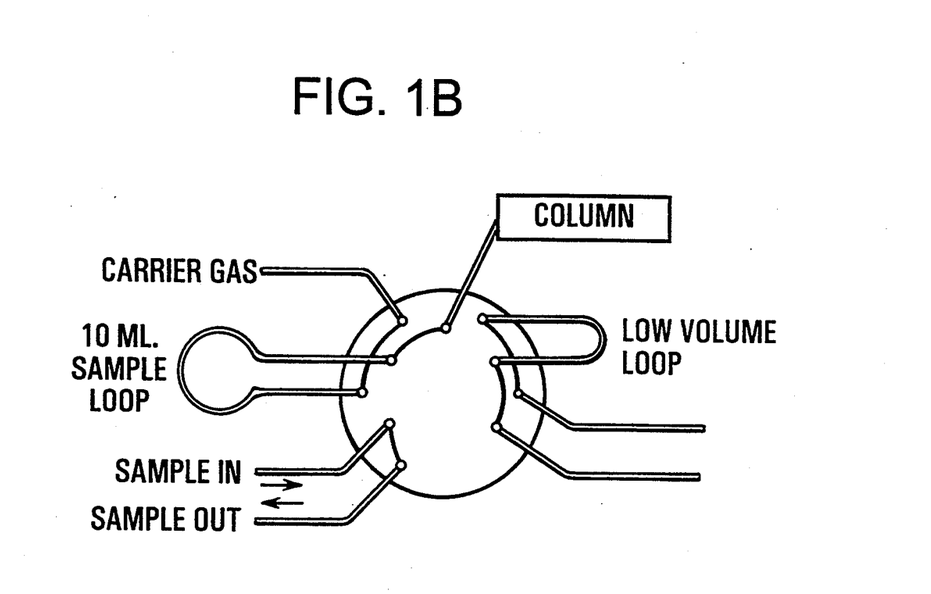
Figure 2:
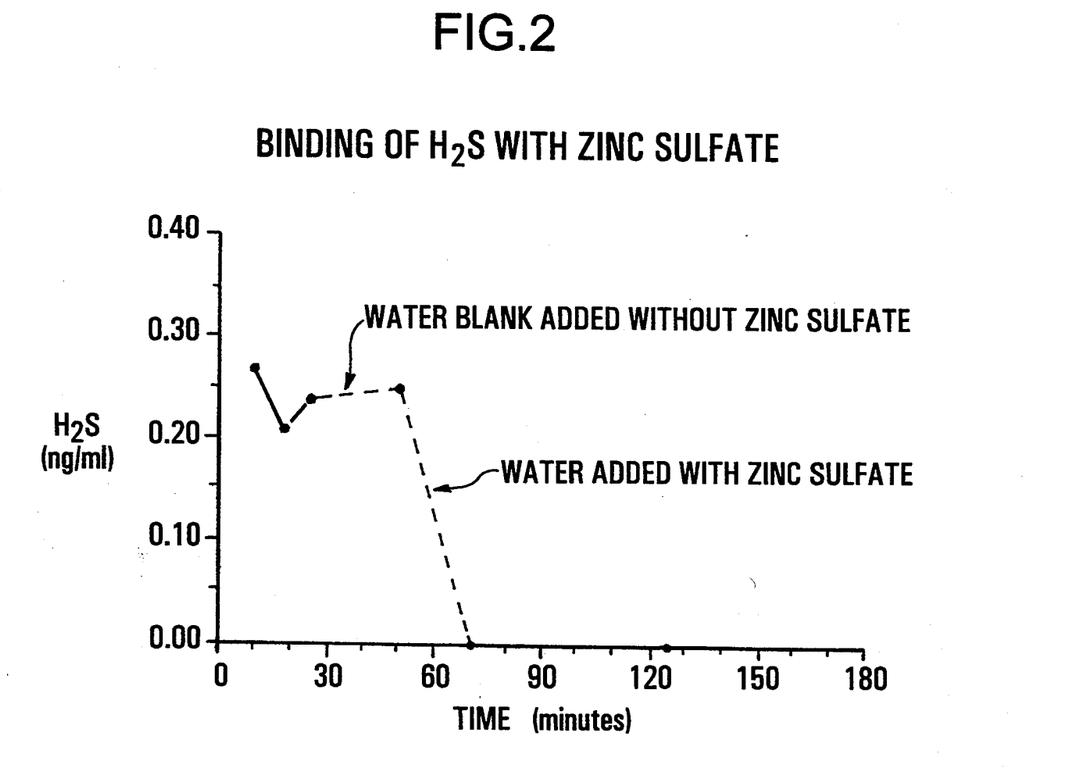
FIG. 2 is a graph of the binding of $H_2S$ with zinc sulfate.

A Hewlett Packard 5890 gas chromatograph was used for all the breath sampling work. The injector was equipped with a 10 port Valco sampling valve from Supelco Inc. (Cat. No. 2-2981M) and a 16.5 foot X ⅛ inch O.D. teflon sample loop. With a 1/16 inch I.D., this tube had a volume of 10 milliliters. The valve configuration with attached tubes are shown in FIGS. 1A and 1B. In the sample load position (FIG. 1A), the carrier gas flows continuously through the "Low Volume Loop", to the column and then to the detector. In this position the 10 ml sample loop is open to the atmosphere, and can be "washed out" using a syringe attached to the "Sample Out" line. When a breath sample is to be taken, the sample tube (attached to the "Sample In" port) is placed in the dog's mouth. A 60 ml syringe, attached to the "Sample Out" port is used to pull 20 ml of mouth air, of which 10 ml fill the "Sample Loop". The valve is then switched to the inject position (FIG. 1B), and the Start button on the integrator is pushed. The carrier flow is now diverted to the "Sample Loop", picking up the breath sample, moves through the column and on to the detector. When the chromatogram is completed, the valve is switched back to the load position, and the process is repeated for the next sample.

The chromatographic column was 25 feet X ⅛ inch teflon packed with 5 percent polyphenol ether and 0.5 percent phosphoric acid on 40/60 mesh teflon. All the tubing, valves, and connections in contact with the sulfur compounds were teflon coated, since glass or metal tend to adsorb these compounds making consistent, reliable results difficult to obtain.

The gas chromatograph was connected to a flame photometric detector (FPD). Dry compressed air was used as the carrier gas to eliminate the "solvent" front peak from the chromatogram. Carrier gas flow was 13.3 ml/min, however, since the flow meter on this GC is calibrated for nitrogen, the flow was set to a 20.0 ml/min reading to compensate.

The oven temperature was 80° C., the injector temperature was 100° C., and the detector temperature was 150° C. The run time was seven minutes with the peaks of interest eluting at approximately 3 minutes ($H_2S$) and 4 minutes ($CH_3SH$). Computerized integration of the chromatogram and printout of results took about three minutes. Samples were able to be injected every 10 minutes. A third peak, identified as dimethyl sulfide ($CH_3$—S—$CH_3$), often appeared at a retention time of 5.5 minutes.

Calibration of the instrument was accomplished using standard gas permeation tubes from VICI Metronics. The tubes, which emitted the sulfur compounds at a constant rate ($H_2S$ was 105 ng/min and $CH_3SH$ was 55.1 ng/min), were placed inside of a teflon cylinder (in a 30° C. water bath) and connected to a dry compressed air source. A soap film flowmeter measured flow and through calculation (see below), the concentration being injected into the GC was determined. The range of concentrations used for calibration of the gas chromatograph varied from extremely low levels ($H_2S$ was 0.0245 ng/ml and $CH_3SH$ was 0.0125 ng/ml). The upper levels attained were limited by the precision of the flowmeter. Calibration curves were thereby generated.

| GAS CONCENTRATION CALCULATION |
| --- |
| Permeation tube gas rates: $H_2S$ = 105 ng/min |
| $CH_3SH$ = 55.1 ng/min |
| Calculation: $\frac{\text{(gas rate) ng/min}}{\text{(air flow) ml/min}} = \frac{ng}{ml}$ of gas |

After calibration, a reproducibility and precision study was conducted. Good sample to sample reproducibility (<5 percent) was shown for all flows tested. The precision was quite acceptable at the lower flow rates but error increased at the highest flow. The error was most likely due to reduced precision of the flowmeter (i.e., calculation of expected VSC levels) at these higher rates.

A standard procedure was developed to sample a dog's breath. Prior to and during each sample, the dog was made to sit as quietly as possible. A teflon coated tube was placed in the dog's oral cavity, with the tube's opening near the front of the mouth above the tongue. The trainer held the mouth gently closed while the dog breathed through its nose for one minute. After one minute, a second person (GC operator) pulled a 20 ml headspace sample which was immediately injected onto the gas chromatograph column. This technique gave high enough results to be meaningful, and good reproducibility.

The subject's (dog) breath was sampled several times before any treatments were given. This established the baseline data for both compounds of interest, $H_2S$ and $CH_3SH$. The results of each compound were averaged, and given the value of 100 percent for that dog on that day. After treatment (chewing biscuit, breath spray, etc.) the breath was sampled as often as conveniently possible and results reported as percent of the initial 100 percent baseline readings. A plot of the results can be made of amount of compound (ng/ml) versus time.

The dogs were not allowed to eat or drink anything for 12 hours prior to being tested. Testing was begun as early as possible in the morning (usually 7:00 AM) before their morning exercise and ended by 9 to 9:30 AM when the dogs were normally fed.

PROTOTYPE BISCUITS CONTAINING ACTIVE BREATH CONTROL AGENTS

Medium Mint Milk Bone ® dog biscuits (which contain mint) were produced with 2 and 4 mg of zinc/biscuit, the ionic zinc ($Zn^{++}$) being in the form of zinc sulfate. Also, as a comparative product, Mint Milk Bone ® dog biscuits were made which additionally contained (internally) with 4 and 8 mg of chlorophyll (from alfalfa). Chlorophyll was chosen because it is "recognized" by the consumer as a breath freshening agent. Mint Milk Bone ® dog biscuits with no active agent were also prepared to be used as controls.

Before any breath evaluations were begun, palatability studies were run using these biscuits to see if dogs would accept them. Using 18 dogs (required number) these initial palatability studies were successful.

INITIAL ORGANOLEPTIC STUDIES

Subjective organoleptic studies using the zinc sulfate biscuits, were conducted at kennels to get an initial indication as to the efficacy of this product. Using 10 dogs, over the course of two weeks, both low zinc (2 mg) and high zinc (4 mg) biscuit types (zinc salt was formulated in the biscuits) were evaluated using the following scale:

1 - very bad breath
2 - bad breath
3 - "normal" dog breath
4 - good breath
5 - very good, minty breath The test results, listed below in Tables II and III, show the breath given by kennel personnel before (B) and after (A) the biscuit was taken. An increase in the number indicated an improvement in breath. Since the product worked, the next step was the objective evaluation of the dog's breath using GC.

TABLE II

| | 4 mgs of zinc/biscuit | | | | | | | | | |
| --- | --- | --- | --- | --- | --- | --- | --- | --- | --- | --- |
| | Day 1 | | Day 2 | | Day 3 | | Day 4 | | Day 5 | |
| DOG | B | A | B | A | B | A | B | A | B | A |
| 1. | 3 | 3 | 2 | 2 | 2 | 2 | 2 | 2 | 2 | 2 |
| 2. | 3 | 3 | 3 | 3 | 3 | 3 | 3 | 3 | 3 | 3 |
| 3. | 3 | 3 | 3 | 3 | 3 | 3 | 3 | 3 | 3 | 3 |
| 4. | 2 | 2 | 2 | 3 | 1 | 3 | 1 | 3 | 1 | 2 |
| 5. | 2 | 3 | 2 | 3 | 2 | 3 | 2 | 3 | 2 | 3 |
| 6. | 1 | 2 | 3 | 3 | 3 | 3 | 1 | 3 | 2 | 3 |
| 7. | 3 | 3 | 2 | 3 | 2 | 3 | 3 | 3 | 2 | 2 |
| 8. | 2 | 3 | 3 | 3 | 3 | 3 | 2 | 3 | 2 | 2 |
| 9. | 2 | 3 | 3 | 3 | 3 | 3 | 3 | 3 | 2 | 3 |
| 10. | 3 | 3 | 3 | 3 | 3 | 3 | 3 | 3 | 3 | 3 |

$\frac{18 \text{ improvements}}{50 \text{ Tests}} = 36$ percent success

TABLE III

| | 4 mgs of zinc/biscuit | | | | | | | | | |
| --- | --- | --- | --- | --- | --- | --- | --- | --- | --- | --- |
| | Day 1 | | Day 2 | | Day 3 | | Day 4 | | Day 5 | |
| DOG | B | A | B | A | B | A | B | A | B | A |
| 1. | 2 | 3 | 2 | 2 | — | — | 2 | 2 | — | — |
| 2. | 3 | 3 | 3 | 3 | 3 | 3 | 3 | 3 | 2 | 3 |
| 3. | 3 | 3 | 3 | 3 | 3 | 3 | 3 | 3 | 2 | 3 |
| 4. | 2 | 2 | 2 | 2 | 3 | 3 | 1 | 2 | 2 | 3 |

TABLE III-continued

|  | 4 mgs of zinc/biscuit | | | | | | | | | |
|---|---|---|---|---|---|---|---|---|---|---|
|  | Day 1 | | Day 2 | | Day 3 | | Day 4 | | Day 5 | |
| DOG | B | A | B | A | B | A | B | A | B | A |
| 5. | 3 | 3 | 3 | 3 | 2 | 3 | 3 | 3 | 2 | 2 |
| 6. | 3 | 3 | 3 | 3 | 2 | 3 | 3 | 3 | 2 | 2 |
| 7. | 3 | 3 | 3 | 3 | 3 | 3 | 3 | 3 | 3 | 3 |
| 8. | 3 | 3 | 3 | 3 | 3 | 3 | 3 | 3 | 3 | 3 |
| 9. | 3 | 3 | 3 | 3 | 3 | 3 | 3 | 3 | 2 | 3 |
| 10. | 3 | 3 | 3 | 3 | 3 | 3 | 3 | 3 | 3 | 3 |

$\frac{8 \text{ improvements}}{48 \text{ Tests}} = 17 \text{ percent success}$

SHORT AND LONG TERM BISCUIT EVALUATION

Short and long term tests using the gas chromatograph to collect data to evaluate the efficacy of the biscuits containing (inside of) active breath control agents were conducted. The above organoleptic evaluation showed that the higher level of zinc was more effective than the lower level. Therefore, the high level of zinc chlorophyll containing (inside of) biscuits were used for these tests. Several types of control biscuits were also to be used where appropriate in the design of these protocols.

Short Term Test Protocol—This protocol is identical to the procedure used to evaluate mint and gum products on human subjects. It showed the immediate effect of a specific biscuit on diminishing breath VSC. The subject dogs were handled in the same manner each morning during the test and both medium and large dogs (listed in Table IV) were used. A baseline level of each volatile sulfur compound was established (as described previously), a biscuit administered, and breath samples taken as often as possible until the test ended. The biscuits used in this study are Mint Milk Bone ® dog biscuits with no active agent (control), Mint Milk Bone ® dog biscuits containing (inside of) 4 mg of zinc (as zinc sulfate) per biscuit, and Mint Milk Bone ® dog biscuits containing (inside of) 8 mgs of chlorophyll per biscuit.

Short Term Test Results—Each biscuit type was tested ten times on ten different dogs. Chlorophyll was no more effective than the control against either $H_2S$ or $CH_3SH$. The high zinc biscuit, however, lowered $H_2S$ by about 25 percent from initial levels and maintained this effectiveness for the 90 minute test period. $CH_3SH$ was lowered by 40 percent with the high zinc biscuit, and this level was maintained for 80 minutes.

Long Term Test Protocol—This study showed the effect of a biscuit on a specific dog's breath over a period of eight weeks. Medium and large dogs were used (Table IV). Half of the population testing a specific biscuit had their teeth cleaned prior to the test period. Gas chromatographic data and organoleptic data was collected on each dog once a week, and each group of dogs received the same biscuit type daily for the entire test period. The five conditions used during this test were: (1) no biscuit, (2) regular non-mint Milk Bone ® dog biscuits, (3) Mint Milk Bone ® dog biscuits with no active agent, (4) Mint Milk Bone ® dog biscuits containing (inside of) 4 mg of zinc (as zinc sulfate) per biscuit, and (5) Mint Milk Bone ® dog biscuits containing (inside of) with 8 mg of chlorophyll per biscuit.

Long Term Test Results—After eight weeks, there were some slight trends seen, but these were judged to be statistically insignificant. It was interesting to note that in four of the five groups studied, the dogs with recently cleaned teeth were found to have worse breath (both organoleptically and by gas chromatograph) than those with unclean teeth. The only case where this did not hold true was with the chlorophyll biscuit group, where dogs with clean and unclean teeth were indistinguishable.

It was concluded from these tests that biscuits containing 4 mg of zinc (as zinc sulfate), which has been mixed or incorporated into the dough before baking, do diminish dog breath malodor and maintain this effect for at least 80 to 90 minutes.

TABLE IV

| DOGS USED FOR SHORT AND LONG TERM TESTING | |
|---|---|
| Short Term Testing | |
| Control Biscuit | seven medium size dogs and three large size dogs |
| Zinc Biscuits | seven medium size dogs and three large size dogs |
| Chlorophyll | seven medium size dogs and three large size dogs |
| Long Term Testing | |
| Control, non-Mint | M, clean   L, unclean |
| Control, Mint | M, clean   two M, unclean |
| High chlorophyll | M, clean   M, unclean |
| High Zinc | M, clean   L, unclean |
| No Biscuit | M, clean   L, unclean |

Note:
M means medium size dog; L means large size dog

ZINC SPRAY EVALUATION

To test zinc's effectiveness, a zinc sulfate solution was sprayed directly into a dog's mouth. This would permit optimum mouth/tongue contact and confirm its effectiveness.

A spray bottle was used to hold a zinc solution which was formulated so that each spray burst contained 15 mg of zinc (in the sulfate form). It was administered by the dog's trainer by pulling back on the dog's jowls and spraying once on each side of the dog's mouth between the outside of the teeth and the inside cheek. No unusual reaction of the dogs was observed. The total amount of zinc applied was 30 mg. A water spray was used as a negative control.

Twenty three dogs were evaluated organoleptically by kennel personnel before and after the zinc spray treatment. One dog was also tested for VSC using the gas chromatograph both before and after spraying. In all cases, a very significant improvement in breath was noted. Gas chromatograph data from the dog with the worst breath showed a drop from 0.16 ng/ml ($H_2S$) and 0.07 ng/ml ($CH_3SH$) to zero for both compounds after the treatment. The water spray (without zinc) was also tested randomly on several dogs. No change in breath malodor was noted using this control.

Additional testing established that a level as low as 5.0 mg of zinc, when sprayed into a dog's mouth, diminished breath malodor for up to one hour.

This series of tests clearly demonstrated that all typical malodor compounds are removed by zinc treatment. This led to the next set of experiments which attempted to determine the effectiveness of various water soluble and water insoluble zinc salts at diminishing dog breath malodor. The zinc salts tested were:

TABLE V

| Compound | M.W. | Zinc, % | Amt (mg) of compd req'd to get 1 mg of zinc | Amt (mg) of cmpd req'd in 0.75 ml for 5 mg Zinc/spray |
|---|---|---|---|---|
| Zinc sulfate | 179.44 | 36.44 | 2.74 | 13.70 |
| Zinc chloride | 136.29 | 47.98 | 2.08 | 10.40 |
| Zinc gluconate | 453.34 | 14.42 | 6.93 | 34.65 |
| Zinc oxide | 153.39 | 42.63 | 2.35 | 11.75 |
| Zinc citrate | 574.32 | 34.16 | 2.93 | 14.65 |

The last two compounds, zinc oxide and zinc citrate, are fairly water insoluble but the maximum concentration was used that could be solubilized for testing. Zinc stearate is completely insoluble in water, actually repelling it, and was not used. A water blank was used as a negative control.

The dog breath testing was conducted in a manner similar to the previous evaluations. The zinc sprays used were formulated so that one shot of spray (0.75 ml) contained 5 mg of $Zn^{++}$. Each solution was sprayed twice into the dog's mouth by the dog's handler. Each dog's breath was evaluated organoleptically by three evaluators both before and after spraying. The sprays were administered in random order so the evaluators had no idea as to which was being applied. Each zinc salt was tested eight times (using eight dogs). Water was used as a negative control.

The evaluator's description of each dog's breath was ranked from 3 (strongest breath) to 0 (no odor) as shown below. Strong (3)→Medium (2)→Light (1)→No odor (0)

The effectiveness of each zinc solution was calculated by subtracting the breath value after the spray treatment from the value before the treatment. For example, a breath sample considered "strong" (3) before spraying and "light" (1) after spraying was given a value of −2, which was the degree of reduction. A breath sample going from medium (2) to medium-light (1.5), was given a value of −0.5. The combined results from each dog tested were added together and are shown below. The larger the negative number, the greater the change in breath from bad to good (i.e., more effective spray).

TABLE VI

| TEST SOLUTION | TOTAL |
|---|---|
| Zinc gluconate | −11.5 |
| Zinc sulfate | −9.5 |
| Zinc chloride | −7.5 |
| Zinc citrate | −6.0 |
| Zinc oxide | −3.0 |
| Water | −2.0 |

The test results showed the two best zinc salts for diminishing dog breath malodor were zinc gluconate and zinc sulfate. Zinc chloride was third. All three are water soluble zinc salts. The two water insoluble zinc salts, zinc oxide and zinc citrate, were somewhat effective, and water was minimally effective.

ZINC DISSOLUTION TEST

One phenomenon that was difficult to explain was why the zinc-containing biscuits didn't diminish breath malodor to the degree anticipated, when the same amount of zinc in spray form virtually eliminated breath malodor. This problem could be explained in one of two ways. First, the zinc was lost during the baking process, or binding to something in the formulation mix that caused it to become ineffective. Second, the biscuit was chewed and swallowed so quickly by the dog that the zinc was not able to combine with the sulfur containing compounds in the oral cavity and eliminate them. These theories were addressed one at a time.

Every batch of biscuits produced was analyzed for zinc. In each case, the actual amount of zinc added to the product was within 15 percent of the analytical results.

To determine whether the zinc was binding to anything in the formulation, a test was developed in which biscuit pieces were soaked in water to allow solubilization of the zinc. The biscuit suspension was filtered and the resulting solution analyzed for zinc. A new batch of Mint Milk Bone ® dog biscuits were produced with 6 mg zinc/biscuit for these dissolution tests.

Two parallel tests were run using these biscuits. In the first test, each biscuit was broken into several pieces, representing a typical dog-chewed biscuit. The second test involved grinding the dry biscuits in a blender, representing an "ideally" chewed biscuit. Ten gram aliquots of each (broken or ground) were placed in beakers and 40 ml of distilled water was added. The suspensions were mixed, and filtered after time intervals to separate the solids from the liquid. Both solid and liquid fractions were then analyzed for zinc with the following results:

TABLE VII

| Sample | Mix Time | Soluble zinc (mg/10 grams) | | | |
|---|---|---|---|---|---|
| | | Solids, mg | Liquid, mg | Total, mg | Zinc Released, % |
| Broken Biscuit | 1 min | 6.00 | 0.03 | 6.03 | 0.50 |
| " | 5 min | 5.90 | 0.03 | 5.93 | 0.51 |
| " | 1 hour | 6.19 | 0.09 | 6.28 | 1.43 |
| " | 4 hours | 6.06 | 0.09 | 6.15 | 1.46 |
| Ground Biscuit | 1 min | 6.44 | 0.11 | 6.55 | 1.68 |
| " | 5 min | 6.64 | 0.15 | 6.79 | 2.21 |
| " | 1 hour | 6.61 | 0.08 | 0.08 | 1.20 |
| " | 4 hours | 6.62 | 0.10 | 6.72 | 1.49 |

This data show that after four hours the amount of zinc released by the ground biscuit is only slightly more than the broken biscuit. However, even under ideal chewing conditions only about 2 percent of the added zinc is released into solution. This supports the theory that even though the zinc is present in the biscuit, it is binding to some component (possibly fiber) and unavailable.

It was decided that a way to circumvent the problem would be to apply a topical coating of zinc on the biscuit. This would allow for more zinc release because the interaction with biscuit components would be reduced. Also the effectiveness of the biscuit would be enhanced due to increased contact of the biscuit surface (i.e., zinc) with the mouth and tongue of the dog.

This matter was tested starting with biscuits containing 6 mg of zinc per biscuit. One set of biscuits (room temperature) were dipped in a solution containing 30 mg of $ZnSO_4.H_2o$/ml or 11 mg of $Zn^{++}$/ml for 15 seconds. This resulted in an average biscuit weight gain of 0.80 grams (8.8 mg of $Zn^{++}$). A second set of biscuits were heated to 220° F. for one hour and then immediately dipped for 15 seconds to simulate an after baking dip. After drying, the biscuits were broken into several pieces and soaked in a water solution for 5 minutes to release the zinc. The solid and liquid fractions were analyzed.

TABLE VIII

| Sample Description | $Zn^{++}$, mg | $Zn^{++}$ Released, % |
|---|---|---|
| Control Biscuit (before soak) | 6.52 | |
| Control Biscuit after 15 second soak | 14.65 | |
| Heated Biscuit | | |
| solid fraction | 11.08 | |
| liquid fraction | 3.64 | 25 |
| Room temp biscuit | | |
| solid fraction | 11.77 | |
| liquid fraction | 4.24 | 26 |

These results unquestionably were an improvement. The amount of zinc released is almost 10 times more than with the previously-tested, undipped biscuits. Another experiment was then set up to test the reverse, i.e., to ascertain if zinc would be adsorbed (bind) to ground Milk Bone ® dog biscuits.

Regular Milk Bone ® dog biscuits (without added zinc) were ground in a Waring blender to optimize adsorption conditions. A stock zinc solution was made up containing 16 mg of $Zn^{++}$/60 ml. Ground biscuits (20 grams=2 biscuits) were weighed into 100 ml beakers, 60 ml of $Zn^{++}$/water added, and stirred continuously. After the indicated time, the biscuit/water suspension was filtered and the liquid fraction was analyzed for zinc. A zinc/water solution was also run which contained Chelex 100 (Bio-Rad), a metal chelating resin—this would bind all the soluble zinc in solution and act as another control system. The results were as follows:

TABLE IX

| Sample Description | Time, Min | mg/60 ml | Loss, % |
|---|---|---|---|
| 1. Zinc sol'n + no biscuits (control) | — | 16.50 | — |
| 2. Zinc sol'n + 20 gms ground biscuit | 5 | 7.91 | 52 |
| 3. Zinc sol'n + 20 gms ground biscuit | 60 | 4.54 | 72 |
| 4. Zinc sol'n + 3.9 gms Chelex 100 | 5 | 0.014 | +99 |
| 5. Zinc sol'n + 3.9 gms Chelex 100 | 60 | 0.0005 | +99 |

As seen from this data, zinc is readily adsorbed into ground Milk Bone ® dog biscuits. The samples with the added metal chelating agent show that the zinc can, indeed, be fully adsorbed out of solution.

ZINC SULFATE COATED DOG BISCUITS

With the information gained from the above coating work, zinc sulfate coated biscuits using the "quick dip" technique were produced that had better zinc release than biscuits internally containing the same amount Of zinc before baking. Since several biscuits were on hand with a confirmed amount of zinc in them (6 mg/biscuit), this was taken as the target. The dip time was 3 seconds (which is reasonable for a post-bake dipping operation in a plant).

Calculation for the required concentration of the zinc solution (3.34 grams of $ZnSO_4 \cdot H_2O$ to 100 ml of water) was made after several weighings of dry versus water-dipped biscuits to determine the average weight gained. The biscuits to be coated were weighed before and after the 3 second dip, and gained from 0.47 to 0.52 grams each with an average gain of 0.49 grams. The zinc solution contained 12 mg of $Zn^{++}$/ml, therefore, the zinc coating had a content around the 6 mg of $Zn^{++}$/biscuit target. After dipping, the biscuits were air dried overnight.

When dry, each biscuit was broken into seven pieces, added to 40 ml of water, and stirred for the indicated time. After filtering, the liquid fraction was analyzed for zinc. The results obtained were as follows:

TABLE X

| Sample Description | Stir Time, min. | Analysis ($Zn^{++}$), mg | Zinc Released, % |
|---|---|---|---|
| Plant produced 6 mg biscuit | — | 6.13 | — |
| Broken plant biscuit | 30 | 0.08 | <2 |
| Control biscuit (not dipped) | — | 0.06 | — |
| Zinc-sulfate dipped biscuit in 40 ml of water | — | 5.93 | — |
| Broken biscuit in 40 ml of water | 5 | 2.12 | 36 |
| Broken biscuit in 40 ml of water | 10 | 2.03 | 34 |
| Broken biscuit in 40 ml of water | 20 | 2.11 | 36 |
| Broken biscuit in 40 ml of water | 30 | 2.30 | 39 |

The results show that the average amount of zinc released from these dipped biscuits (regardless of stir time) is approximately 36 percent. This is much improved over the 2 percent of zinc released from plant produced biscuits containing 6 mg of zinc added prior to baking. This demonstrates that release is much more efficient in biscuits when the zinc is applied as a dipped-coating rather than baked in.

RAWHIDE CHEW STRIPS

It has been demonstrated that zinc is effective at diminishing dog breath malodor, and the best delivery system for optimum effectiveness is addition to the coating of the product. Since contact time is also important, a rawhide chew strip coated with zinc was tested. This allowed fast zinc release (since it is in the coating and not baked in) and also longer contact time (since it is chewed rather than quickly swallowed).

To evaluate the release of zinc from rawhide chew strips, rawhide chew strips weighing an average of 9.1 grams each were dipped in a zinc solution. It was estimated that each was coated with approximately 15 mg of ionic zinc ($Zn^{++}$).

The strips were cut into large pieces, and 7.0 gram aliquots were placed in 400 ml beakers. Water was added, the samples were stirred for the indicated amount of time and filtered under vacuum through Whatman #1 paper. An undissolved chew strip as well as the liquid fractions were analyzed for zinc.

TABLE XI

| Sample Weight, gm | Water Volume, ml Initial | Water Volume, ml After | Dissolution Time, min. | Results, Zinc Release, mg |
|---|---|---|---|---|
| — | 70 | 70 | 0 | <0.01 (neg. ctl) |
| 7.0 | 70 | 68 | 1 | 1.44 |
| 7.0 | 70 | 68 | 5 | 1.37 |
| 7.0 | 70 | 67 | 15 | 1.32 |
| undissolved chew strip (positive control) 1.91 mg of $Zn^{++}$/7.0 grams | | | | |

The actual amount of zinc on the strip was only 17 percent of expected, but using the actual amount, about 55 percent of the zinc was released. An explanation for the variation in these results may be due to normal variability in weight and thickness of the product. The weight of strips with identical dimensions varied significantly. This means that even though the same sample weight was used each time in the above experiment, the amount of zinc available might be different, since it is a function of surface area.

In order to ascertain what happened to the zinc coating on the rawhide chew strip, the process of producing the coating on rawhide chew strips was performed and the mixture was analyzed at each step to determine at which point the zinc was lost was analyzed.

Three groups of sample mixes were formulated. The first group was a control and contained no added zinc sulfate. The second group contained a 1X level of zinc sulfate and the third group contained a 2X level of zinc sulfate. The formulas used and results obtained are shown below in Table XII. The calculations are based on milligrams of $Zn^{++}/100$ grams.

In the first step, a portion of the dry mix was replaced with zinc sulfate monohydrate. Results showed a 10 to 14 percent deviation on the high side for the zinc-containing mixes.

Step two included adding tallow and water, and heating the mixture for several minutes prior to dipping the rawhide strip. Samples of the hot liquid were taken before dipping, allowed to cool, and analyzed. Results of the 1X group were within 1 percent of the expected values, and the 2X level showed an 18 percent deviation on the low side.

Step three involved coating the rawhide strips. Due to variation in rawhide weight, thickness and size, the calculation of zinc in the applied coating at this step is probably the most susceptible to error. The theoretical amount of zinc was calculated based on dry rawhide weights (before and after dipping) and the dry/wet ratio from the previous step. The results for the 1X and 2X groups were, respectively, 61 percent and 76 percent lower than expected.

After handling of the chew strips, it was ascertained that most of the zinc is being lost somewhere after the dipping step, probably falling off or being rubbed away during routine handling after drying.

TABLE XII

| | Group 1 | Group 2 | Group 3 |
|---|---|---|---|
| STEP 1 - DRY MIX | | | |
| dry mix | 15.00 gm | 13.89 gm | 12.78 gm |
| $ZnSO_4.H_2O$ | 0.00 gm | 1.11 gm | 2.22 gm |
| $Zn^{++}/100$ gm - calc | — | 2694 mg | 5388 mg |
| analytical results | — | 3060 mg | 5908 mg |
| deviation | — | +14% | +10% |
| STEP 2 - WET MIX (based on 100 grams) | | | |
| dry mix | 15.00 gm | 13.89 gm | 12.78 gm |
| $ZnSO_4.H_2O$ | 0.00 gm | 1.11 gm | 2.22 gm |
| tallow | 1.00 gm | 1.00 gm | 1.00 gm |
| water | 84.00 gm | 84.00 gm | 84.00 gm |
| $Zn^{++}/100$ gm - calc | — | 404 mg | 808 mg |
| analytical results | — | 400 mg | 665 mg |
| deviation | — | −1% | −1% |
| STEP 3 - COATED STRIPS | | | |
| $Zn^{++}/1.94$ gm (wet coat) | — | 7.8 mg | 15.6 mg |
| $Zn^{++}/7.7$ gram chew strip | — | 7.8 mg | 15.6 mg |
| $Zn^{++}/100$ gram chew strip - calc. | — | 102 mg | 204 mg |
| analytical results | <1 mg | 40 mg | 49 mg |
| deviation | — | −61% | −76% |

MECHANISM OF ZINC REACTION WITH SULFUR COMPOUNDS

The mechanism of how zinc sulfate decreases the level of volatile sulfur compounds in the mouth was suspected to be either chemical or antibacterial. While some metal ions are known to exhibit antimicrobial properties, the action seen in the mouth seems much too immediate for this to be the case. It was, therefore, thought to be more than likely a chemical reaction with the sulfur compounds present in the oral cavity.

To test the chemical theory approach, the following experiment was conducted. Hydrogen sulfide gas was slowly bubbled through distilled water until a saturated solution was obtained. 0.1 ml of this solution was added to 5 mls of distilled water placed in a 30 ml teflon tube with a teflon seal. The average of three headspace samples of this tube showed approximately 0.24 ng of $H_2S$/ml. 0.1 ml of distilled water (control) was injected into the tube through the seal and the solution mixed thoroughly. Headspace analysis showed no change in $H_2S$ concentration. Next, 0.36 mg of $Zn^{++}$ (as $ZnSO_4.H_2O$) in 0.1 ml of distilled water was injected in the same manner, and the solution was again, mixed thoroughly. Headspace samples taken immediately and over the next two hours showed complete elimination of the $H_2S$ from the tube. See FIG. 3.

This data suggests that the zinc and sulfur compounds chemically bind to each other, forming a nonvolatile entity. Zinc ions and most transition-metal sulfides do react chemically with $H_2S$. Documented methods state that certain metal ions become insoluble in solutions saturated with $H_2S$ as depicted by the following example, where $Me^{+2}$ is a divalent metal ion.

$$Me^{+2} + SO_4^{-2} + H_2S \rightarrow MeS \text{ (insoluble)} + 2H^+ + SO_4^{-2}$$

What is claimed is:

1. A breath freshening pet biscuit comprising a breath freshening effective amount of at least one water-soluble zinc salt topically applied to a farinaceous-based baked biscuit for quick release upon consumption, the amount of said topically-applied water-soluble zinc salt being sufficient so that said topically-applied water-soluble zinc salt contains from about 2 mg to about 6 mg of zinc ion per 10 gm of the biscuit.

2. The biscuit as claimed in claim 1 wherein said biscuit is a canine biscuit and said at least one water-soluble zinc salt is at least one member selected from the group consisting of zinc sulfate, zinc gluconate and zinc chloride.

3. The biscuit as claimed in claim 1 wherein said at least one water-soluble zinc salt is applied in a coating composition comprising a fat.

4. The biscuit as claimed in claim 1 wherein said at least one water-soluble salt is applied in aqueous solution.

5. A process for controlling the malodorous breath of an animal by the consumption of the pet biscuit of claim 1 by the animal.

6. A method for preparing a breath freshening pet biscuit comprising:
 (a) forming a farinaceous-based dough into pieces;
 (b) baking the pieces; and
 (c) applying at least one water-soluble zinc salt to the surface of the baked pieces in an effective breath freshening amount for quick release upon consumption, wherein said at least one water-soluble zinc salt is applied in an amount to deliver from at least about 2 mg to about 6 mg of zinc ions per biscuit.

7. The method as claimed in claim 6 wherein said at least one water-soluble zinc salt is applied as an aqueous solution.

8. The method as claimed in claim 6 wherein said at least one water-soluble zinc salt is applied by dipping the baked pieces in an aqueous solution comprising said at least one water-soluble zinc salt.

9. The method as claimed in claim 6 wherein said at least one water-soluble zinc salt is applied by spraying the baked pieces with an aqueous solution comprising said at least one water-soluble zinc salt.

10. The method as claimed in claim 6 wherein said at least one water-soluble zinc salt is applied in a coating composition comprising fat.

11. The method as claimed in claim 6 wherein said at least one water-soluble zinc salt comprises at least one member selected from the group consisting of zinc sulfate, zinc gluconate and zinc chloride.

12. A breath freshening, dry pet food comprising a breath freshening amount of at least one water-soluble zinc salt topically applied to a farinaceous-based baked or cooked pet food for quick release upon consumption, the amount of said at least one water-soluble zinc salt being sufficient so that said topically-applied water-soluble zinc salt contains from about 2 mg to about 6 mg of zinc ion per 10 gm of the breath freshening pet food, the water activity of said breath freshening dry pet food being less than or equal to about 0.7 and the moisture content being less than or equal to about 15 percent by weight of the breath freshening pet food.

13. The breath freshening dry pet food as claimed in claim 12 wherein said at least one water-soluble zinc salt comprises at least one member selected from the group consisting of zinc sulfate, zinc gluconate, and zinc chloride.

14. The breath freshening dry pet food as claimed in claim 12 wherein said at least one water-soluble zinc salt is applied in a coating composition comprising a fat.

15. The breath freshening dry pet food as claimed in claim 12 wherein said at least one water-soluble zinc salt is applied in aqueous solution.

16. A process for controlling the malodorous breath of an animal by the consumption of the dry pet food of claim 12 by the animal.

17. A process for controlling the malodorous breath of an animal by the chewing of the rawhide chew of claim 1 by the animal.

18. A process as claimed in claim 12 wherein at least 15% by weight of the total amount of soluble zinc or zinc ion ($Zn^{++}$) topically applied to the pet food is delivered in the oral cavity for reaction with volatile sulfur compounds.

19. A breath freshening rawhide chew comprising a breath freshening effective amount of at least one water-soluble zinc salt topically applied to rawhide for quick release upon consumption, the amount of said topically-applied water-soluble zinc salt being sufficient so that said topically-applied water-soluble zinc salt contains from about 6 mg to about 20 mg of zinc ion per 9.1 gm of rawhide chew.

20. The breath freshening rawhide chew as claimed in claim 19 wherein said at least one water-soluble zinc salt is at least one member selected from the group consisting of zinc sulfate, zinc gluconate and zinc chloride.

21. The breath freshening rawhide chew as claimed in claim 19 wherein said at least one water-soluble zinc salt is applied in a coating composition comprising a fat.

22. The breath freshening rawhide chew as claimed in claim 19 wherein said at least one water-soluble zinc salt is applied in aqueous solution.

23. A method for preparing a breath freshening rawhide chew comprising:
   (a) forming rawhide into pieces; and
   (b) applying at least one water-soluble zinc salt to the surface of the pieces in an effective breath freshening amount for quick release upon consumption, wherein said at least one water-soluble zinc salt is topically applied in an amount which is sufficient so that the at least one water-soluble zinc salt contains at least about 6 mg to about 20 mg of zinc ions per 9.1 gm of rawhide chew.

24. The method as claimed in claim 23 wherein said at least one water-soluble zinc salt is applied in an aqueous solution.

25. The method as claimed in claim 23 wherein said at least one water-soluble zinc salt is applied by dipping the rawhide pieces in an aqueous solution comprising said at least one zinc salt.

26. The method as claimed in claim 23 wherein said at least one water-soluble zinc salt is applied by spraying the rawhide pieces with an aqueous solution comprising said at least one zinc salt.

27. The method as claimed in claim 23 wherein said at least one water-soluble zinc salt is applied in a coating composition comprising fat.

28. The method as claimed in claim 23 wherein said at least one water-soluble zinc salt comprises at least one member selected from the group consisting of zinc sulfate, zinc gluconate and zinc chloride.

29. A process as claimed in claim 17 wherein at least 25% by weight of the total amount of soluble zinc or zinc ion ($Zn^{++}$) topically applied to the pet food is delivered in the oral cavity for reaction with volatile sulfur compounds.

* * * * *